United States Patent [19]

Cameron

[11] Patent Number: 4,785,281

[45] Date of Patent: Nov. 15, 1988

[54] MECHANICAL IMPLEMENTATION OF UNAMBIGUOUS AUTOMOTIVE BRAKE SIGNAL LIGHTS

[76] Inventor: David L. Cameron, 620 Hamlet Dr., Port Orange, Fla. 32019

[21] Appl. No.: 66,211

[22] Filed: Jun. 25, 1987

[51] Int. Cl.⁴ .............................................. B60Q 1/26
[52] U.S. Cl. ..................................... 340/74; 340/103; 340/120; 340/124; 340/136; 340/66; 362/71; 362/187; 367/10 LS
[58] Field of Search ........................ 340/74, 66, 67, 69, 340/71–73, 82, 84, 87, 103, 120, 124, 136, 145, 815.09, 815.29; 362/65, 66, 71, 166, 167, 174, 187, 268, 270–272, 285, 286, 311, 317, 321; 307/10 LS

[56] References Cited

U.S. PATENT DOCUMENTS

| | | | |
|---|---|---|---|
| 3,281,786 | 10/1966 | Leichsenring | 340/66 |
| 3,299,553 | 1/1967 | Newmman et al. | 340/124 |
| 3,748,643 | 7/1973 | Jacobs | 340/71 |
| 4,652,851 | 3/1987 | Lewin | 340/74 |

Primary Examiner—Donnie L. Crosland

[57] ABSTRACT

A mechanical method is described whereby the brake signal provided by the rear lights of an automotive vehicle is made unambiguous. In the case that the brake pedal of the said vehicle is not actuated, the invention causes all light from illuminated rear lamps of the vehicle to be transmitted from the rear of the vehicle as non-red colored light. In the case that the brake actuation means of the vehicle is actuated, the invention causes all light from illuminated rear lamps to be transmitted from the rear of the vehicle as red colored light. Thus, display of red colored light per se at the rear of the vehicle provides an absolute, immediately perceptible signal of braking.

3 Claims, 2 Drawing Sheets

MECHANICAL IMPLEMENTATION OF UNAMBIGUOUS AUTOMOTIVE BRAKE SIGNAL LIGHTS

Electric switching means to effect red colored light per se as an unambiguous signal of braking have been described previously (Cameron, U.S. Pat. No. 4,666,795; 04/28/87). The current invention comprises mechanical means employed for the same purpose, said means being first described in Disclosure Document No. 138861, dated 6/21/85.

BACKGROUND OF THE INVENTION

The fundamental rear lights of automotive vehicles comprise the tail lights; the rear turn signal lights; and the brake signal lights. In existing rear lighting systems, display of red colored tail lights (and in some cases even red colored rear turn signal lights !) causes ambiguity that delays perception of the brake signal. This ambiguity is compounded by display, during braking, of multiple colored lights having different meanings. When the brake pedal of a vehicle with illuminated tail lights is depressed, to quickly perceive the brake signal, the driver of a following vehicle must actually see the intensity of the red colored light increase. Otherwise, perception of the brake signal is delayed while the driver decides that the red colored lights on the rear of the vehicle ahead are not just tail lights. It is clearly imperative that perception of the brake signal occur as quickly as possible after the brake signal lights are first seen. Delayed perception of the brake signal is a significant contributing factor in many rear-end automotive vehicle collisions.

The addition of an "eye level" collision avoidance brake light, comprising an additional red colored light unique solely by virtue of its position, will improve, but not optimize, perceptibility of the brake signal. The plethora of red colored light constantly displayed during normal night driving partially habituates drivers to red colored stimuli, thereby compromising the ability of drivers to immediately respond to such stimuli, especially in the case of fatigued or otherwise mentally impaired drivers, or in the case of impaired visability. Adding more red colored light to a background already filled with red colored light does not provide a very pronounced signal of braking. Color CHANGE from non-red to red, on the other hand, provides a very pronounced signal of braking, one able to be immediately perceived, and to evoke a response in a minimum amount of time.

SUMMARY OF THE INVENTION

Mechanical means are described whereby, in the case that the brake actuation means of an automotive vehicle is not actuated, light emanating toward the rear from all illuminated rear lamps of the said vehicle is caused to be transmitted through material containing a non-red colored pigment, such as an amber; a yellow; an orange; or a green colored pigment, said pigment causing said light to be further transmitted from the rear of said vehicle as non-red colored light.

An addition object of the invention is to provide mechanical means whereby, in the case that the brake actuation means of an automotive vehicle is actuated, light emanating toward the rear from all illuminated rear lamps of the said vehicle is caused to be transmitted through material containing a red colored pigment, said pigment causing said light to be further transmitted from the rear of said vehicle as red colored light, the display of red colored light at the rear of said vehicle then comprising an absolute signal of braking.

These and additional implied objects are accomplished by the current invention, the embodiment described herein comprising: electrical means to illuminate rear lamps effecting the tail light, the rear turn signal light, and the brake signal light on each side of an automotive vehicle; a translucent screen containing a non-red colored pigment, and a translucent screen containing a red colored pigment, on each side of said vehicle; and, mechanical means whereby said translucent screens are translocated such that, in the case that the brake actuation means of the said vehicle is not actuated, the said translucent screens containing non-red colored pigment are positioned immediately behind said rear lamps, and, in the case that the brake actuation means of the said vehicle is actuated, the said translucent screens containing red colored pigment are positioned immediately behind said rear lamps.

BRIEF DESCRIPTION OF THE DRAWINGS

To illustrate and explain the invention, there are shown in the figures embodiments which may in some applications be preferred, it being understood, however, that the invention is not limited to the precise forms shown.

DETAILED DESCRIPTION

Figure 1:
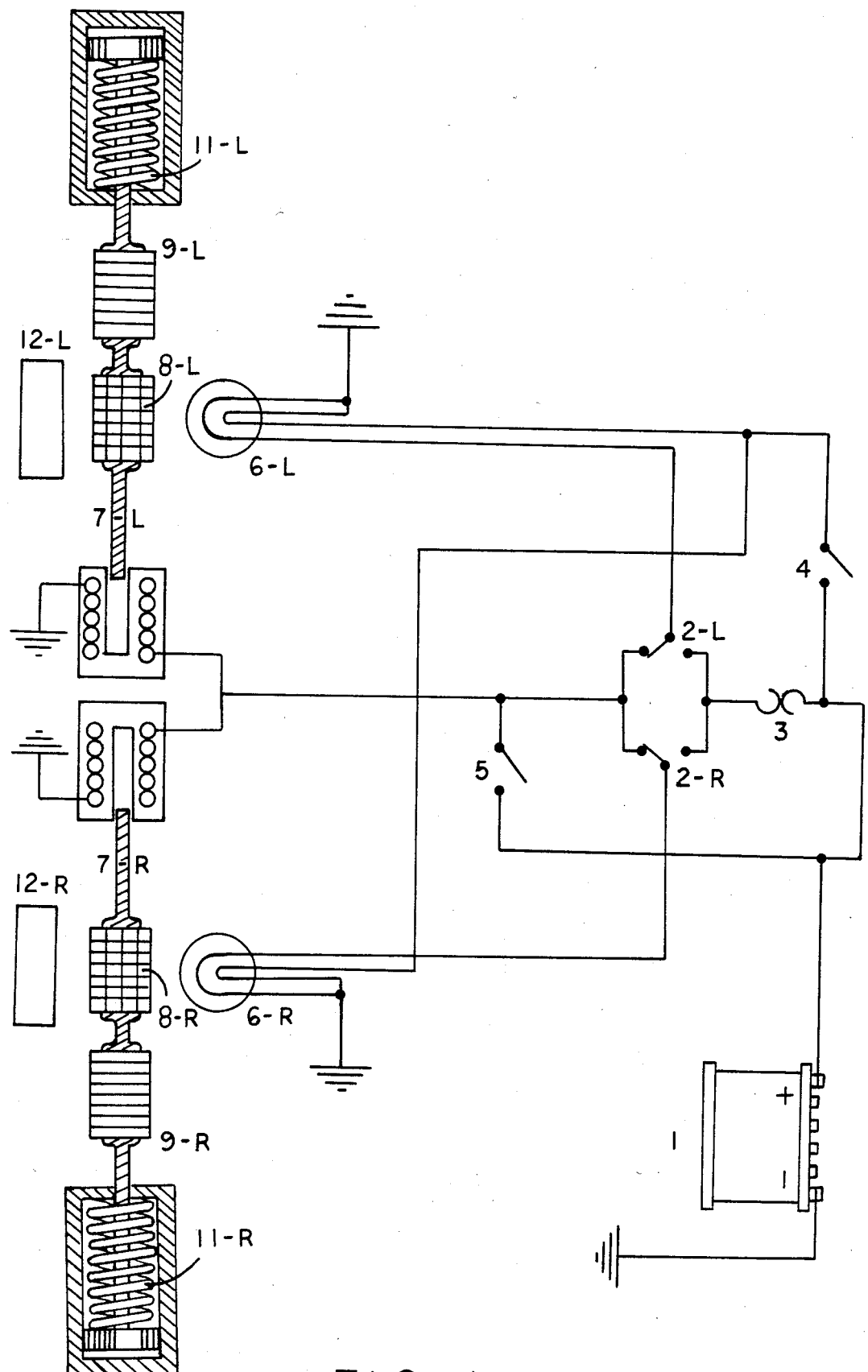
FIG. 1 is a schematic diagram showing incorporation of a given embodiment of the invention into the rear lighting system of an automotive vehicle, said embodiment comprising: a trifunctional rear lamp on each side of the said vehicle, each of said lamps containing means to effect the tail light, the rear turn signal light, and the brake signal light of said vehicle; a source of electrical energy, electrical conductor means, and electric switching means to effect illumination of said trifunctional rear lamps; and, on each side of the said vehicle; a colorless translucent screen affixed to the body of the vehicle, and a translucent screen containing a non-red colored pigment and a translucent screen containing a red colored pigment, said screens being affixed to a movable ferrous support, each of said ferrous supports being translocated by the actuation of a dc solenoid when the brake actuation means of said vehicle is actuated, and by the action of a compression spring when said brake actuation means is released.

As shown in FIG. 1, trifunctional rear lamps 6-L and 6-R on each side of an automotive vehicle, said lamps containing means to effect the tail lights, the rear turn signal lights, and the brake signal lights of said vehicle,are illuminated in a manner commonly employed in the prior art. Illumination of said rear lamps occurs upon closure of electric circuits between said lamps and a source of electrical energy 1. When all electric switching means are in their normal positions, as shown in the figure, rear lamps 6-L and 6-R are not illuminated. When tail light switch 4 is actuated, there are closed electric circuits between said source of electrical energy 1 and said rear lamps 6-L and 6-R, said closed electric circuits enabling energizing electric current to constantly flow through said rear lamps, said flow of energizing electric current effecting constant illumination of said lamps, said illumination persisting as long as said tail light switch 4 is actuated. When either the left 2-L or the right 2-R turn signal selector switch is actuated, there is an intermittently closed electric circuit between said source of electrical energy 1 and said trifunctional rear lamp 6-L or 6-R on the side of the actuated turn signal selector switch, the flasher device 3 alternately opening and closing said electric circuit, said circuit enabling energizing electric current to intermittently flow through said rear lamp 6-L or 6-R, said flow of energizing electric current effecting intermittent illumination of said rear lamp 6-L or 6-R, said intermittent illumination persisting so long as said turn signal selector switch 2-L or 2-R is actuated. When the spring-loaded brake light switch 5 is actuated by actuation of the brake actuation means of the said vehicle, in the case that the turn signal selector switches 2-L and 2-R are in their normal positions, there are closed electric circuits between said source of electrical energy 1 and said rear lamps 6-L and 6-R, said closed circuits enabling energizing electric current to constantly flow through both of said rear lamps 6-L and 6-R, said flow of energizing electric current effecting constant illumination of said rear lamps; or, in the case that one of said turn signal selector switches is actuated when brake light switch 5 is actuated, there is closure of an electric circuit to rear lamp 6-L or 6-R on the side of the vehicle opposite to the side of the actuated turn signal selector switch 2-L or 2-R, said closed electric circuit enabling energizing electric current to constantly flow through said rear lamp 6-L or 6-R, thereby effecting constant illumination of the said rear lamp, said illumination persisting so long as brake light switch 5 is actuated. The remaining components of the lighting system shown in FIG. 1 are unique to the current invention.

A rigid ferrous support 7-L and 7-R is positioned to the rear of the said trifunctional lamp 6-L and 6-R on each side of the said vehicle, said supports being adapted to hold translucent screens 8-L and 8-R, said screens containing a non-red colored pigment, and to hold translucent screens 9-L and 9-R, said screens containing a red colored pigment, and said ferrous supports being movable along a line perpendicular to the driving path of said automotive vehicle. In the case that brake light switch 5 is in its normal position, there is no flow of energizing electric current through solenoids 10-L and 10-R, compression springs 11-L and 11-R causing said supports to be positioned such that said translucent screens 8-L and 8-R are directly to the rear of rear lamps 6-L and 6-R, thereby causing, in the case that said rear lamps are illuminated due to actuation of tail light switch 4 or one of the turn signal selector switches 2-L and 2-R, all light emanating toward the rear from said illuminated rear lamps 6-L and 6-R to be transmitted through translucent screens 8-L and 8-R, said non-red colored pigment causing said light to be further transmitted as non-red colored light, said non-red colored light being subsequently transmitted without color change through colorless translucent screens 12-L and 12-R, said colorless translucent screens being affixed to the body of said automotive vehicle. Thus, in the absence of braking, non-red colored tail lights and rear turn signal lights will be visible from behind said automotive vehicle. In the case that the spring-loaded brake light switch 5 is actuated, there are closed electric circuits between the source of electrical energy 1 and said solenoids 10-L and 10-R, said closed electric circuits enabling energizing electric current to constantly flow through said solenoids, said flow of energizing electric current causing magnetic induction to emanate from the said solenoids, said magnetic induction acting on said ferrous supports to effect translocation of said supports, such that said translucent screens 9-L and 9-R are directly to the rear of rear lamps 6-L and 6-R, thereby causing all light emanating toward the rear from said illuminated rear lamps to be transmitted through translucent screens 9-L and 9-R, said red colored pigment causing said light to be further transmitted as red colored light, said red colored light being subsequently transmitted without color change through colorless translucent screens 12-L and 12-R. Thus, upon actuation of brake light switch 5, in the case that tail lights and rear turn signal lights are not illuminated, red colored lights appear as the signal of braking; or, in the case that non-red colored tail lights and rear turn signal lights are illuminated, said non-red colored lights are replaced by red colored lights as the signal of braking, said red colored lights persisting as long as said brake light switch 5 is actuated. When the said brake actuation means is released, allowing said brake light switch 5 to return to its normal position, the electric circuits between the source of electrical energy 1 and said solenoids 10-L and 10-R are opened, thereby terminating flow of energizing electric current through the said solenoids, said termination of current flow ending the action of magnetic induction on said ferrous supports, said compression springs 11-L and 11-R then causing said supports to return to their normal positions, in which said translucent screens 8-L and 8-R are directly to the rear of rear lamps 6-L and 6-R. In the case that tail lights and rear turn signal lights are illuminated, said lights reappear as non-red colored lights when the brake actuation means of the said vehicle is released.

Figure 2:
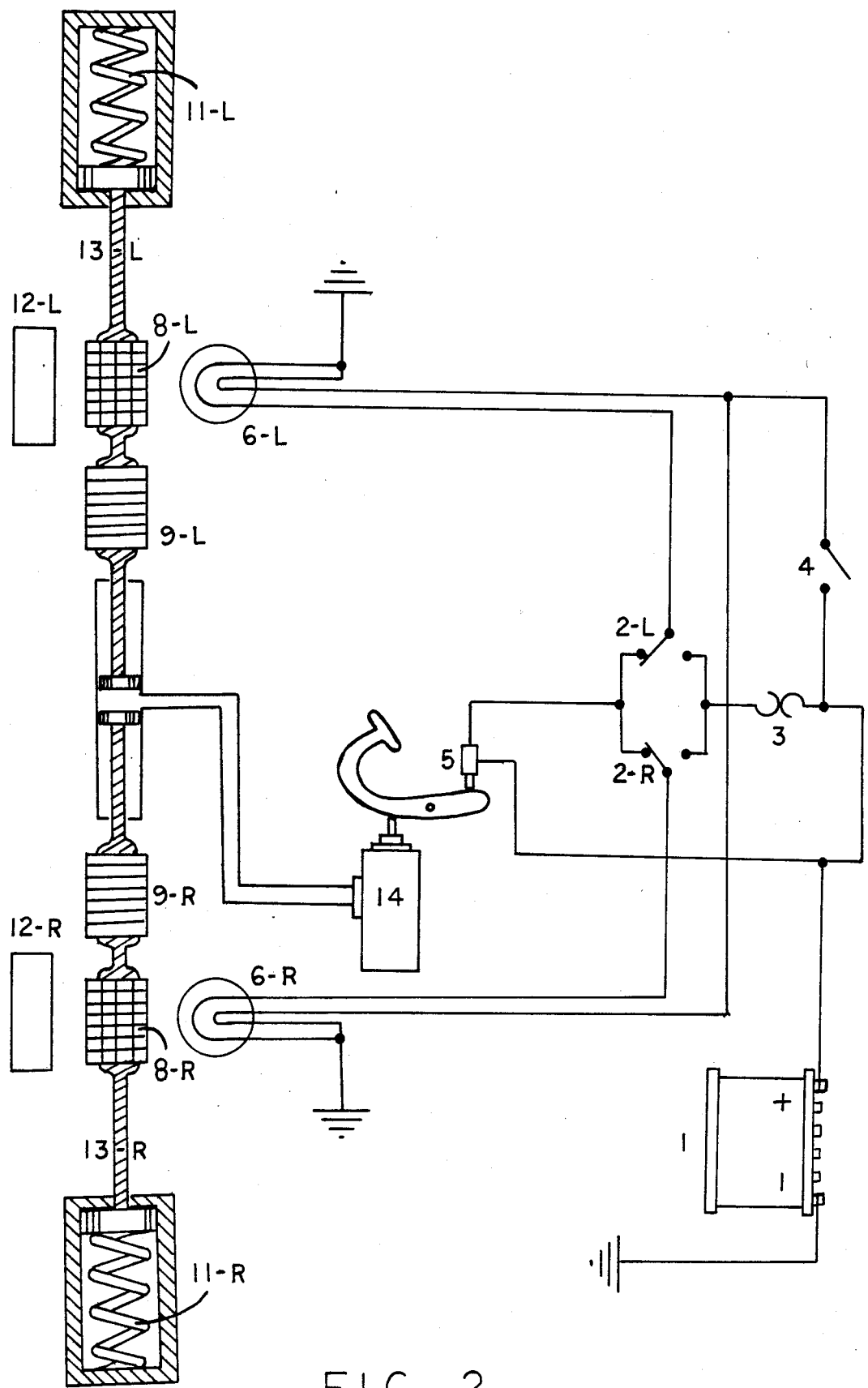
FIG. 2 is a schematic diagram illustrating an alternative embodiment of the invention, said embodiment consisting of electrical and mechanical components as illustrated in FIG. 1 except that the dc solenoids are replaced by lines from the hydraulic brake system of said vehicle, each of said supports being translocated, upon actuation of said brake actuation means, by the increased pressure in said hydraulic brake system.

The function of the alternative embodiment of the invention shown in FIG. 2 is essentially identical to the function of the system shown in FIG. 1, except that said rigid supports may not contain ferrous material, and that translocation of said supports is not effected by energization of solenoids, but by pressurization of the hydraulic brake system of the automotive vehicle. The tail lights, rear turn signal lights, and brake signal lights of said vehicle are effected by illumination of trifunctional rear lamps 6-L and 6-R, as described for the system shown in FIG. 1. Rigid supports 13-L and 13-R, said supports being fabricated of ferrous or non-ferrous material, and said supports being adapted to hold translucent screens 8-L, 8-R, 9-L, and 9-R, are positioned to the rear of rear lamps 6-L and 6-R. In the case that the brake actuation means of said vehicle is not actuated, pressure in the hydraulic brake system 14 of said vehicle is low, compression springs 11-L and 11-R then causing said rigid supports 13-L and 13-R to be positioned such that translucent screens 8-L and 8-R, said screens containing a non-red colored pigment, are directly to the rear of rear lamps 6-L and 6-R. When said brake actuation means is actuated, increased pressure in the hydraulic brake system 14 effects translocation of said rigid supports 13-L and 13-R such that translucent screens 9-L and 9-R, said screens containing a red colored pigment, are directly to the rear of rear lamps 6-L and 6-R. When the brake actuation means in released, pressure in said hydraulic brake system 14 decreases, said compression springs 11-L and 11-R then causing said rigid supports 13-L and 13-R to return to their normal positions, in which translucent screens 8-L and 8-R are again directly to the rear of rear lamps 6-L and 6-R.

The over-all objective of the invention is to eliminate ambiguity in brake signaling by the rear lights of automotive vehicles. This is accomplished by translocation of pigmented translucent screens such that, in the case that the brake actuation means of a vehicle is not actuated, light emanating toward the rear from all illuminated rear lamps is transmitted from the rear of said vehicle as non-red colored light, and, in the case that said brake actuation means is actuated, said light is transmitted from the rear of said vehicle as red colored light. Thus, the display of red colored light as the rear of said automotive vehicle constitutes an absolute, immediately perceptible signal of braking.

It is to be understood that the forms of the invention herewith shown and described may comprise preferred embodiments, but not the only possible forms of the invention. Numerous alternative means could be used to effect translocation of pigmented translucent screens. Reflective means could be translocated such that reflected light from illuminated rear lamps is alternatively transmitted through non-red colored material or red colored material. The rear lamps themselves, rather than translucent screens, might be translocated by mechanical means. Such variations in form clearly fall within the spirit and scope of the current invention.

What is claimed is:

1. A method for effecting red colored light at the rear of an automotive vehicle as an unambiguous signal of braking, including the following electrical components:
    a source of electrical energy;
    manually actuated left and right turn signal selector switches;
    a turn signal flasher device for automatically opening and closing electric circuits between said source of electrical energy and said turn signal selector switches;
    a manually actuated tail light switch;
    manually actuated brake actuation means;
    a brake light switch actuated by actuation of said brake actuation means;
    lamps illuminated by the flow of energizing electric current to effect the tail lights of said vehicle;
    lamps illuminated by the flow of energizing electric current to effect the rear turn signal lights of said vehicle;
    lamps illuminated by the flow of energizing electric current to effect the brake signal lights of said vehicle; and
    electrical conductor means whereby said components are interconnected; said method comprising:
    mechanical means to reversibly alter the path traversed by light emanating from all said illuminated lamps, said light being subsequently transmitted from the rear of said vehicle, said path alteration causing, in the case that said brake actuation means is not actuated, said light to be transmitted through material containing a non-red colored pigment, said pigment causing said light to be further transmitted as non-red colored light, and said alteration further causing, in the case that said brake actuation means is actuated, said light to be transmitted through material containing a red colored pigment, said pigment causing said light to be further transmitted as red colored light.

2. A method to effect an unambiguous signal of braking as described in claim 1, wherein said mechanical means comprise rigid, movable ferrous supports, said supports being adapted to hold translucent screens containing a non-red colored pigment and translucent screens containing a red colored pigment, the positions of said supports being determined, in the case that said brake actuation means is actuated, by magnetic induction emanating from electrically energized solenoids, and, in the case that said brake actuation means is not actuate, by the action of compression springs.

3. A method to effect an unambiguous signal of braking as described in claim 1, wherein said mechanical means comprise rigid, movable supports, said supports being adapted to hold translucent screens containing a non-red colored pigment and translucent screens containing a red colored pigment, the positions of said supports being determined, in the case that said brake actuation means is actuated, by high pressure in the hydraulic brake system of the said vehicle, and, in the case that said brake actuation means is not actuated, by the action of compression springs.

* * * * *